No. 894,189. PATENTED JULY 28, 1908.
H. N. COX.
WINDMILL DEVICE.
APPLICATION FILED APR. 17, 1907.

WITNESSES:
Robert J. Kent
Mary Emma Cox

INVENTOR
Harold Newton Cox
BY
C. Curtis Gillespie ATTORNEY.

UNITED STATES PATENT OFFICE.

HAROLD NEWTON COX, OF NEW YORK, N. Y.

WINDMILL DEVICE.

No. 894,189. Specification of Letters Patent. Patented July 28, 1908.

Application filed April 17, 1907. Serial No. 368,704.

*To all whom it may concern:*

Be it known that I, HAROLD NEWTON COX, a citizen of the United States, residing at 398 McDonough street, borough of Brooklyn, county of Kings, city and State of New York, have invented a certain new and useful Improvement in Windmill Devices, of which the following is a specification.

My invention relates to improvements in windmill devices as applied to the generation and storage of electricity, wherein a high speed wheel is connected directly to the generator; and uniform speed obtained by the automatic operation of a governing vane or tail which keeps said wheel flat against the wind up to a predetermined speed after which it is turned away from the wind sufficiently to prevent excessive or suicidal speeds. Voltage of generator to be made proportional to speed of wheel by shunting field current from line current thus keeping field current constant. As the speed of the generator increases, the number of storage cells in series with said generator is to be automatically increased.

Figure 1:
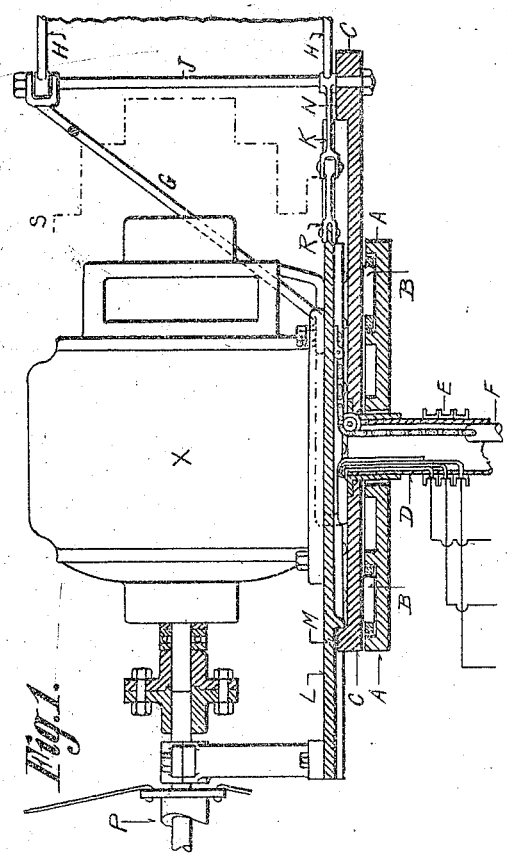
Figure 3:
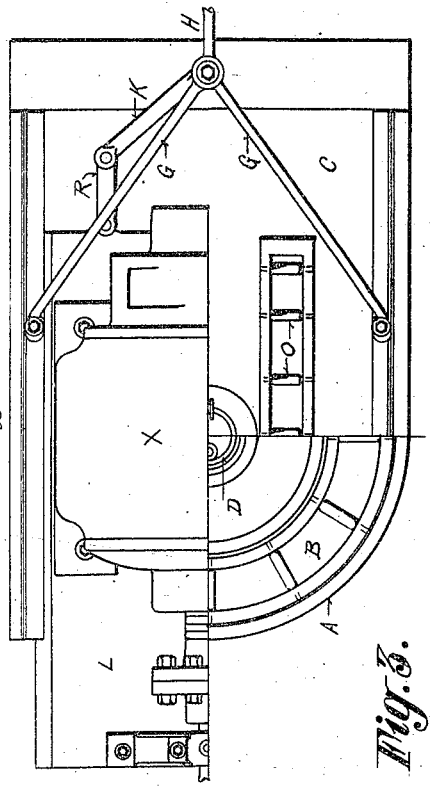
Figure 2:
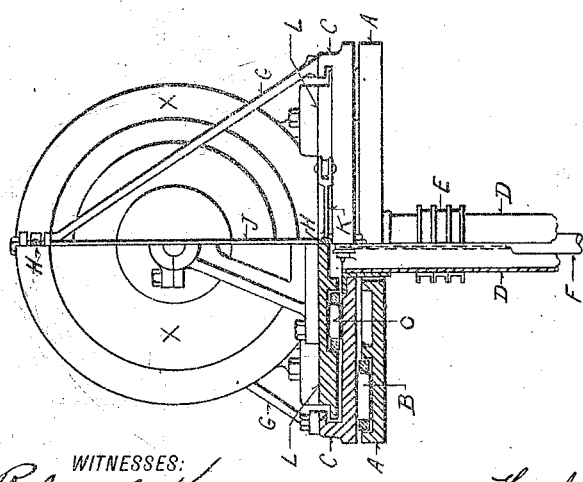

The electrical features of my invention I propose to attain by employing such devices as are already produced. While the mechanical features I accomplish by means of the mechanism illustrated in the accompanying drawings, in which Figure 1 is a partial longitudinal section of the entire device, the wheel to the left and the vane to the right. Fig. 2 is on the right a one-half rear elevation, and on the left a one half combined front elevation and partial cross section, and Fig. 3 is a top view as the device would appear with half of the generator and carriage removed.

Similar letters refer to similar parts throughout the several views.

Plate A the bed plate of my device, is secured to and forms the top of the windmill tower. I have provided on its upper surface an annular channel containing antifriction rollers and guide rings as shown at B.

Plate C rests on the rollers B, free to rotate in a horizontal direction, and is provided with a downwardly projecting hollow shaft passing through a central hole in plate A as shown at D. This said shaft D contains the wiring from the generator X to the conductor E by means of which electrical connection is obtained between the said generator X and a storage battery or other system. This said shaft D also acts as a central channel for passage and operation of weight and chain F, referred to hereinafter. This plate C further carries the windmill vane, the fixed braces for which are shown at G. The upright J and the horizontals H, H, form the inboard end of the said vane, which is free to turn on J as its pivot actuated through the integral arm K hereinafter referred to.

Plate L acting as a carriage for the generator X is provided on its under side with longitudinal channels containing antifriction rollers O (Figs. 2 and 3) and is free to move back and forth on plate C, said movement being guided by lips on the edges of said plate L, running in corresponding grooves on the sides of plate C, the length of this movement is restricted by the lugs M and N at the ends of said plate C. The rear end of carriage L is connected by a connecting rod R with the lever arm K of the vane (Figs. 1 and 3). A movement of L causes a movement of the vane.

To the rear underside of carriage L is secured a chain passing over a roller and downward through the hollow shaft D carrying a weight F above mentioned, whose function is to hold the said carriage L pressed against the forward lug M of plate C (Fig. 1). And when in this position the wheel P (Fig. 1) is at right angles with the vane and at right angles to the direction of the wind. This position is retained as long as the weight F is sufficient to withstand the pressure of the wind on the wheel P, which is predetermined within proper speed limits and when this is exceeded the excessive pressure on the wheel P will lift the weight and cause a backward movement of the carriage L and by its connection through rod R with the arm K, a consequent change in the position of the vane, and the wheel will be partially turned away from the wind so that the pressure on the wheel P and in consequence its speed will be automatically regulated; and will so continue until carriage L has been pushed back to a point when the generator X occupies the position indicated by the dotted line S (Fig. 1). The vane then becomes parallel with the wheel and both parallel to the direction of the wind when rotation of wheel P ceases. A reduction in the pressure of the wind permits a forward movement of carriage L a consequent movement of the vane which again throws wheel P into operation.

Of the numerous forms which have occurred to me, that which I have described and illustrated appeals to me as most practical and economical and on which I claim:

1. In a windmill device, the combination of a rotating support, an axially movable wind wheel mounted thereon, a vane pivotally mounted on said support, and means for transmitting motion from the axially moving wheel to and thereby cause the turning of the vane.

2. In a windmill device, the combination of a rotating support, an axially movable wind wheel mounted thereon, a vane pivotally mounted on said support, means for transmitting motion from the axially moving wheel to and thereby cause the turning of the vane, and an electrical generator driven by said wind wheel.

3. In a windmill device, the combination of a rotating support, an axially movable wind wheel mounted thereon, an electrical generator driven from said wind wheel and axially movable therewith, means for opposing a determinate resistance to the tendency to said axial movement under the influence of wind pressure on said wind wheel, a vane pivotally mounted on said support, and means for transmitting motion from the axially moving wheel to and thereby cause the turning of the vane.

4. In a windmill device, the combination with the tower top plate, of a rotating support having an antifriction bearing on said top plate and provided with a hollow shaft, a horizontally movable plate mounted on said rotating support, a weight in said hollow shaft connected to said horizontally movable plate for urging said plate horizontally in one direction, an electrical generator affixed to said horizontally movable plate, a wind wheel secured to the armature shaft of said generator, electrical connections for said generator supported by said hollow shaft, an upright on said rotating support, a vane pivotally mounted on said upright, and a connection between said horizontally movable plate and said vane substantially for the purpose set forth.

In testimony whereof, HAROLD NEWTON COX has signed his name to this specification in the presence of two subscribing witnesses, this seventh day of February 1907.

HAROLD NEWTON COX.

Witnesses:
ROBERT J. KENT,
MARY EMMA COX.